United States Patent
Zipperer et al.

(10) Patent No.: US 10,627,271 B2
(45) Date of Patent: Apr. 21, 2020

(54) HYDRAULIC SYSTEM FOR ULTRASONIC FLOW MEASUREMENT USING REFLECTIVE ACOUSTIC PATH APPROACH

(71) Applicant: TEXAS INSTRUMENTS INCORPORATED, Dallas, TX (US)

(72) Inventors: Johann Reinhold Zipperer, Unterschleissheim (DE); Peter Wongeun Chung, Frisco, TX (US); Hans Martin Hilbig, Tiefenbach (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/212,082

(22) Filed: Dec. 6, 2018

(65) Prior Publication Data

US 2019/0107419 A1 Apr. 11, 2019

Related U.S. Application Data

(63) Continuation of application No. 15/477,285, filed on Apr. 3, 2017, now Pat. No. 10,151,611.

(60) Provisional application No. 62/427,410, filed on Nov. 29, 2016.

(51) Int. Cl.
   *G01F 1/66* (2006.01)
(52) U.S. Cl.
   CPC .............. *G01F 1/662* (2013.01); *G01F 1/667* (2013.01)
(58) Field of Classification Search
   CPC ........................................................ G01F 1/66
   See application file for complete search history.

(56) References Cited

U.S. PATENT DOCUMENTS

| | | | |
|---|---|---|---|
| 4,638,672 A | 1/1987 | McCall | |
| 4,831,869 A * | 5/1989 | Fowler | G01N 13/00 73/150 A |
| 6,272,934 B1 | 8/2001 | Rajan et al. | |
| 6,386,016 B1 * | 5/2002 | Gleissle | G01N 11/08 73/54.01 |
| 6,612,187 B1 | 9/2003 | Lund | |
| 6,898,986 B2 | 5/2005 | Daniel et al. | |
| 7,059,176 B2 * | 6/2006 | Sparks | G01F 1/8404 73/54.01 |
| 7,624,652 B2 | 12/2009 | Wee et al. | |
| 9,599,548 B2 * | 3/2017 | Okkels | G01N 11/08 |
| 9,645,130 B2 | 5/2017 | Xie et al. | |
| 9,927,270 B2 | 3/2018 | Xie | |
| 2003/0024324 A1 | 2/2003 | Hanl et al. | |
| 2003/0079547 A1 * | 5/2003 | Baek | G01L 9/0042 73/716 |

(Continued)

*Primary Examiner* — Jewel V Dowtin
(74) *Attorney, Agent, or Firm* — Brian D. Graham; Charles A. Brill; Frank D. Cimino

(57) ABSTRACT

A flow meter for determining the flow rate of a fluid through a conduit, including an upper body having an inlet chamber, an acoustic channel, an outlet chamber, a sound wave generator, and a sound wave receiver. The inlet chamber, acoustic channel, and outlet chamber are fluidly connected together. The acoustic channel is a non-linear pathway that is symmetrically dimensioned. The sound wave generator is configured to create a sound wave that moves along the liquid pathway formed by the acoustic channel. The receiver detects that sound wave that has moved through the acoustic channel and such information is used to determine the flow rate of the fluid through the flow meter.

18 Claims, 5 Drawing Sheets

(56) References Cited

U.S. PATENT DOCUMENTS

2018/0149503 A1   5/2018   Zipperer et al.

* cited by examiner

HYDRAULIC SYSTEM FOR ULTRASONIC FLOW MEASUREMENT USING REFLECTIVE ACOUSTIC PATH APPROACH

CROSS-REFERENCE TO RELATED APPLICATIONS

This application is a continuation of U.S. patent application Ser. No. 15/477,285, filed on Apr. 3, 2017, which claims priority to and the benefit of U.S. Provisional Patent Application No. 62/427,410, filed on Nov. 29, 2016, the entireties of which is hereby incorporated by reference.

BACKGROUND

This application pertains to flow meters, particularly to the measurement of liquid flow using sound waves, and more particularly to a device and method for measuring the flow rate of liquid using ultrasonic waves.

The measurement of liquid flow through a pipe is commonly used in many domestic and industrial applications. The flow rate of a liquid through a pipe is typically measured by use of a flow meter. These flow meters include a body that is connected in-line with the flow of liquid in the pipe. A rotation turbine is connected to the body and the rate of rotation of the turbine caused by the flow of the liquid through the flow meter is used to determine the flow rate of a liquid through the pipe. Examples of these turbine-type flow meters are illustrated in US Publication No. 2003/0024324 and the references cited therein. Although these turbine-type flow meters are commonly used, these flow meters contain moving parts that wear out over time, thereby adversely affecting proper flow rate measurements and/or result in complete failure of the flow rate meter. In view of the current state of flow rate meters, there is a need for a flow rate meter that has fewer or no moving parts and optionally can be easily substituted in the housing or body of existing flow rate meters.

SUMMARY

The flow meter with the present disclosure includes an acoustic channel that includes an electroacoustic transducer and an acoustic receiver, and wherein sound waves that are generated by the electroacoustic transducer move generally parallel to the flow path of the liquid flowing through the acoustic channel, and the flow meter has a symmetrical liquid flow path for the liquid that enters and exits the acoustic channel. The electroacoustic transducer can be configured to generate an ultrasonic signal in the acoustic channel. As defined herein, an ultrasonic signal or ultrasonic sound wave has a frequency of over 20,000 Hz, typically around 1 MHz. The acoustic channel generally is a serpentine channel. In one non-limiting specific configuration, the acoustic channel is generally an S-shaped channel. The configuration of the inlet portion of the flow meter that is fluidly connected to the acoustic channel is sized and shaped the same as the outlet portion of the flow meter that is fluidly connected to the acoustic channel so as to avoid and compensate for phase distortions of the liquid flow as the liquid enters the acoustic channel, flows through the acoustic channel, and exits the acoustic channel. As such, the wave front of the sound wave that travels through the acoustic channel is generally uniform when it is received by the acoustic receiver. In such a configuration, the path length of the fluid through a first surface portion of wall from the inlet portion to the outlet portion is the same as the path length of the fluid along a second surface portion of the wall that is located diametrically opposite the first surface portion. The flow meter is generally configured to measure the flow rate of fluids. The type of liquid that can be used with the flow meter is generally not limited.

DETAILED DESCRIPTION

Figure 1:
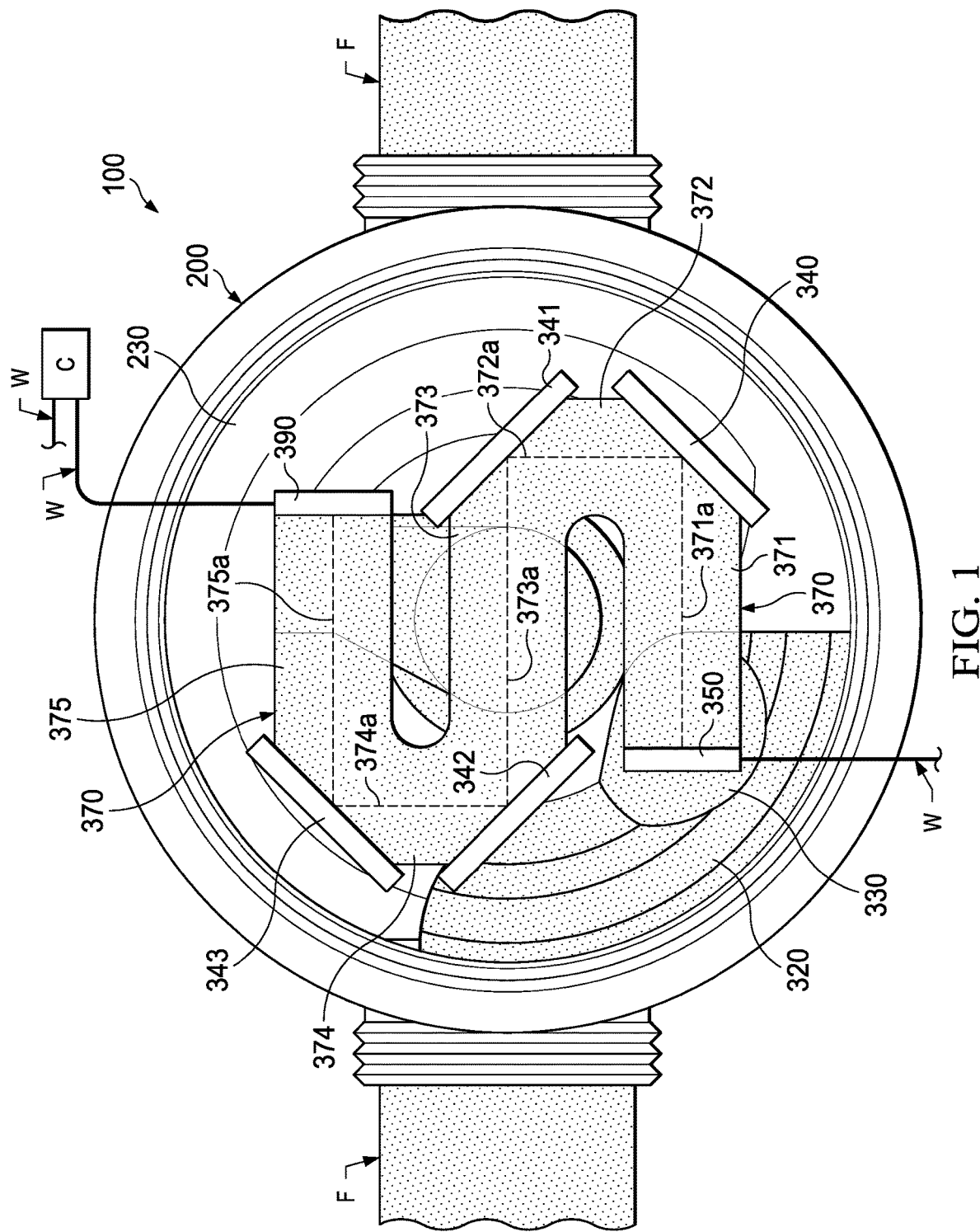
FIG. 1 is a cross-sectional view of a top portion of flow meter according to an embodiment.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function. In the drawings, the various features are not necessarily drawn to scale. In the following discussion and in the claims, the terms "including", "includes", "having", "has", "with", or variants thereof are intended to be inclusive in a manner similar to the term "comprising", and thus should be interpreted to mean "including, but not limited to . . . " In addition, the terms "couple", "coupled" or "couples" are intended to include indirect or direct electrical or mechanical connection or combinations thereof. For example, if a first device couples to or is coupled with a second device, that connection may be through a direct connection, or through an indirect connection via one or more intervening devices and connections. The singular forms "a", "an", and "the" include plural referents unless the context clearly dictates otherwise.

FIGS. 1-4 illustrate one non-limiting embodiment of a flow meter 100 that includes a lower body 200 and an upper body 300. The flow meter is configured to measure the flow rate of a liquid in a pipe or other type of fluid conduit to which the flow meter 100 is connected. The flow meter is configured to measure liquid flow rate by use of sound waves as opposed to the use of a turbine that is used in prior art flow meters. Flow meter 100 typically includes no rotating and/or moving parts to measure the flow rate of liquid; however, this is not required. The size and materials used for the flow meter are non-limiting.

Figure 2:
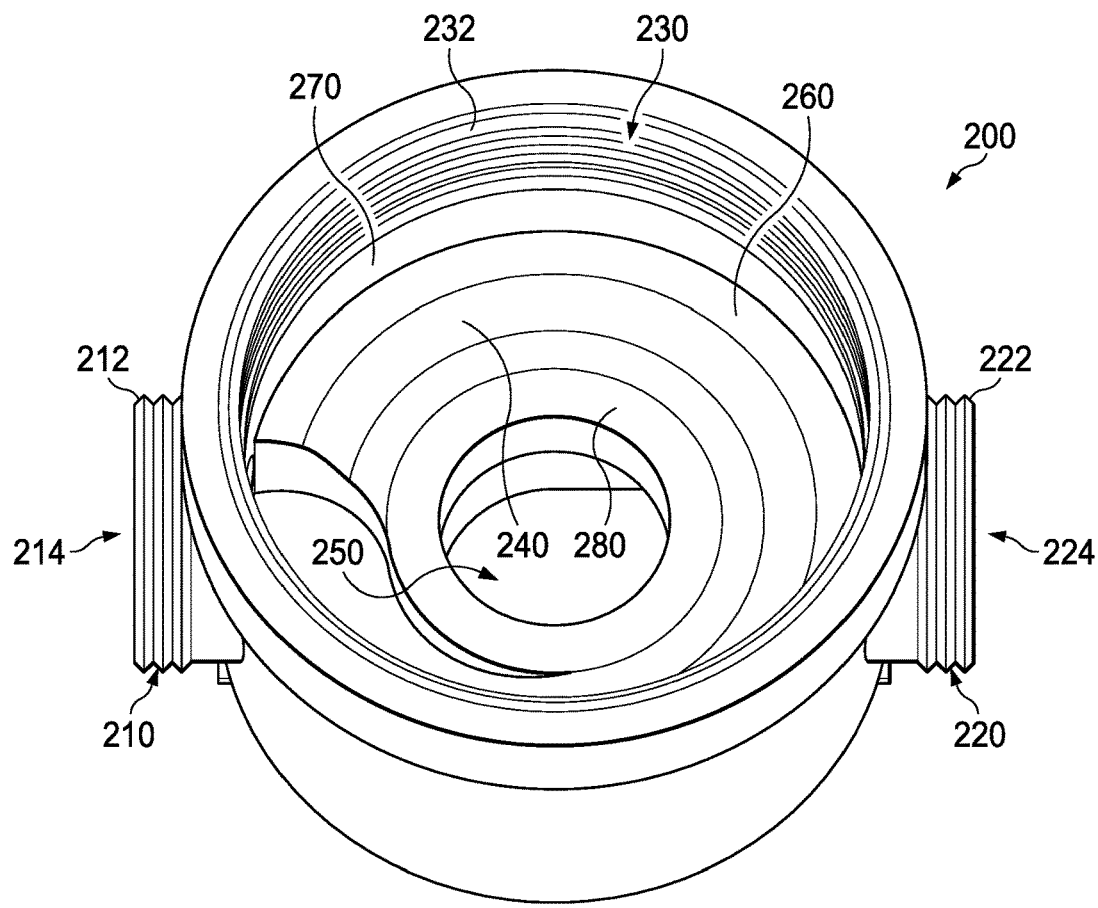
FIG. 2 is a front elevation view of the lower body of the flow meter in accordance with FIG. 1.
Figure 3:
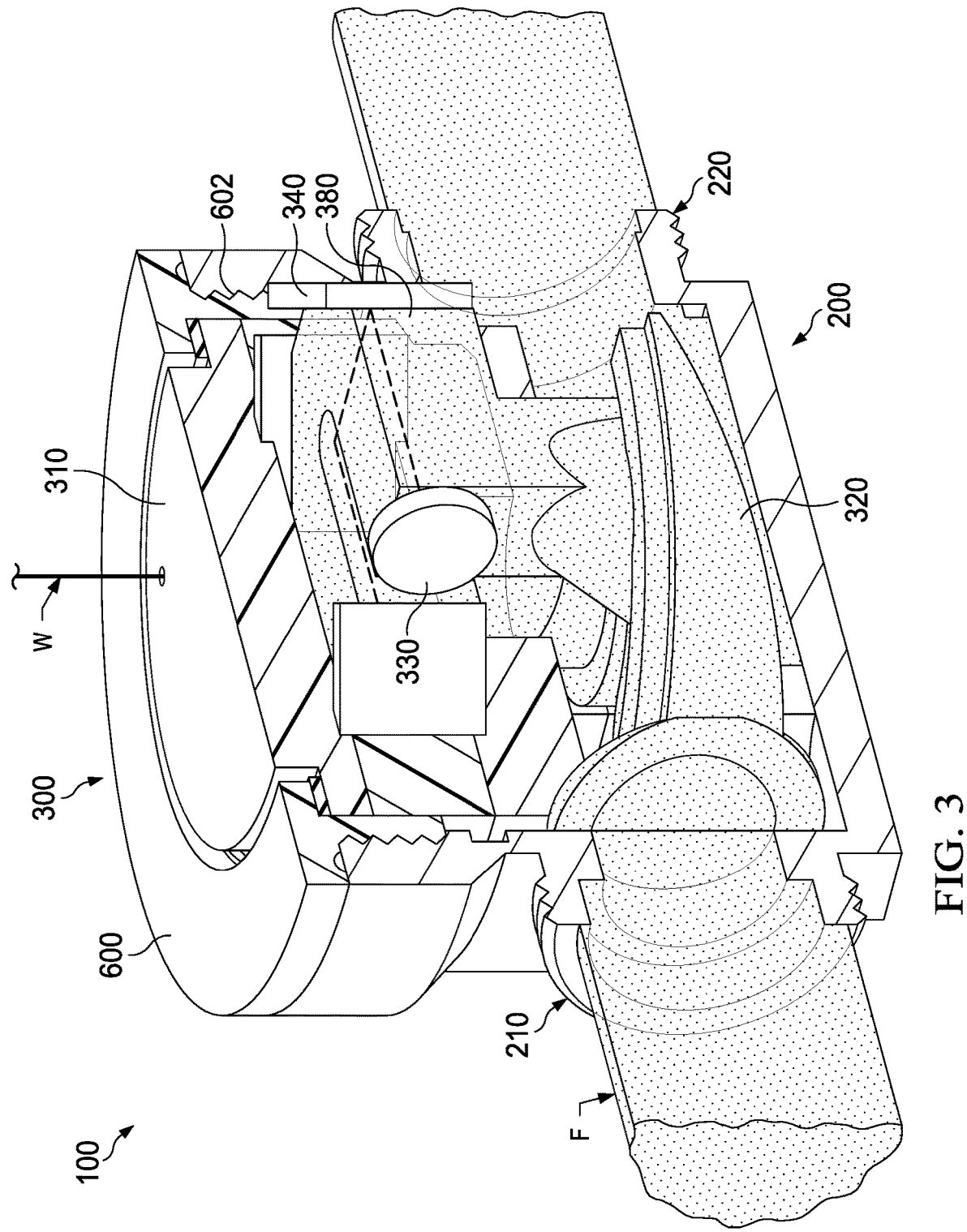
FIG. 3 is cross-sectional view of a side portion of the lower body and upper body of the flow meter in accordance with FIG. 1.

Referring now to FIGS. 1-3, the lower body 200 is configured to be connected in-line to a pipe or other fluid conduit (not shown). The lower body is generally formed of a durable material such as, but not limited to, a metal (e.g., brass, etc.) or a plastic material. As best illustrated in FIG.

2 the lower body includes an inlet connector 210 and an outlet connector 220. The type of connection formed by the inlet and outlet connector is non-limiting. As illustrated in FIG. 2, the inlet connector includes threading 212; however, this is not required. Likewise, the outlet connector includes threading 222; however, this is not required. The inlet connector includes an inlet interior passageway 214 that is fluidly connected to interior cavity 230 of the lower body to enable a liquid F to enter the interior cavity 230. The outlet connector also includes an outlet interior passageway 224 that is fluidly connected to interior cavity 230 of the lower body.

The inner surface of cavity wall 232 of the interior cavity 230 is illustrated as including threading that is used to releasably connect upper body 300 to lower body 200; however, this is not required. As can be appreciated, other or additional arrangements can be used to releasably connect upper body 300 to lower body 200. The interior cavity includes an outer recess 240 and a central opening 250. The inlet interior passageway 214 is fluidly connected to outer recess 240. The outer recess is illustrated as fully encircling central opening 250; however, this is not required. The outer recess is also illustrated as having a variable depth wherein the region of the outer recess that is closest to the opening of the interior passage into the outer recess has a greater depth than one or more other regions of the outer recess; however, this is not required. FIG. 2 illustrates that the depth of the region of the outer recess that is closest to the opening of the interior passage into the outer recess is the greatest and the depth of the outer recess on the opposite side of the central opening 250 has the smallest depth; however, this is not required. The central opening 250 is illustrated has having a circular cross-sectional shape; however, this is not required. The central opening is fluidly connected to outlet interior passageway 224 of the outlet connector 220. The interior cavity 230 of the lower body includes a lower landing 260 that encircles outer recess 240. The top surface of the lower landing is generally the same height as the top surface of cavity wall 280 that encircles the central opening 250; however, this is not required. A groove 270 optionally exists between lower landing 260 and the inner surface of wall 232 of the inner cavity.

Figure 4:
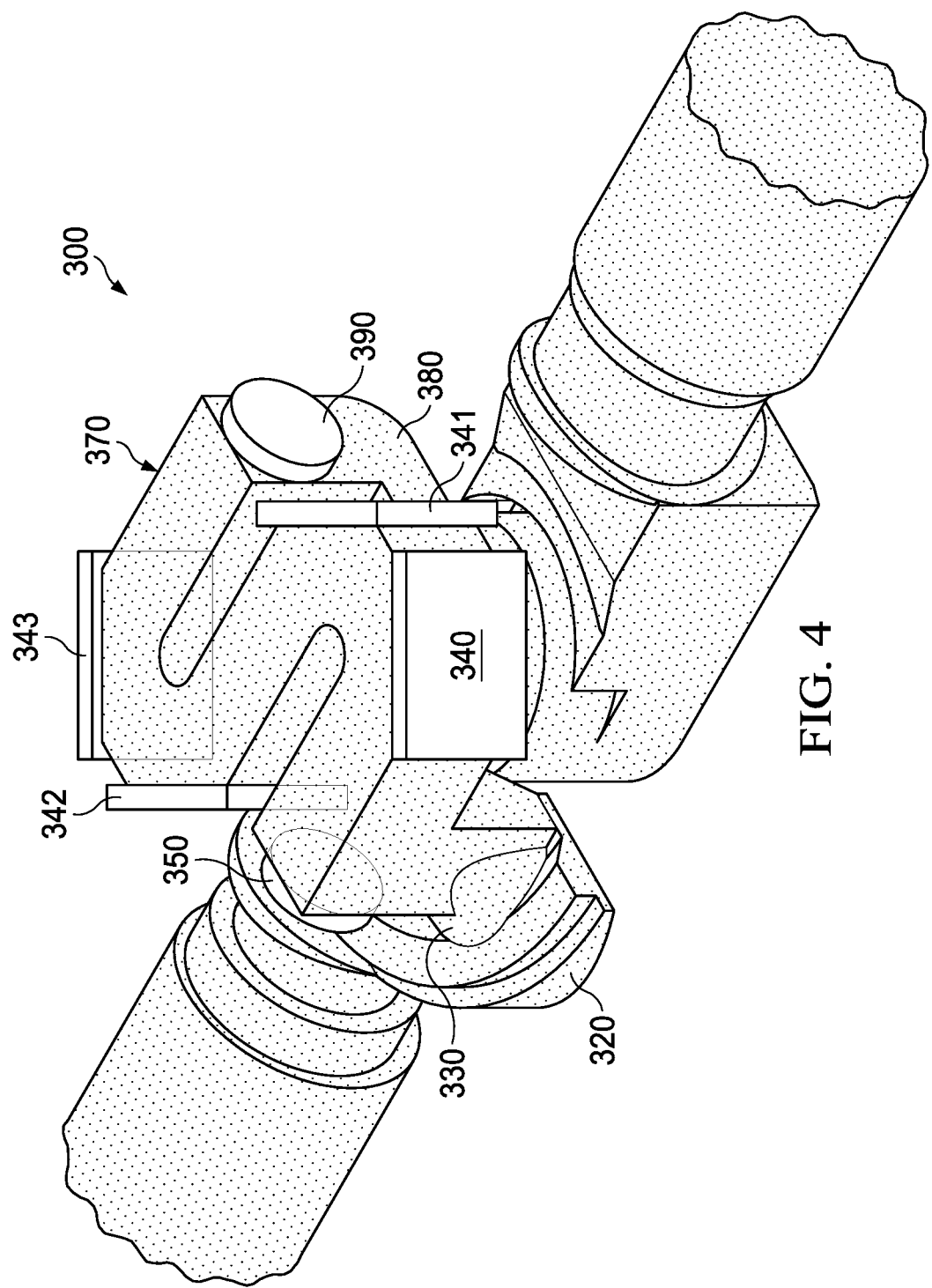
FIG. 4 is a partial view of the upper body illustrating the flow path of liquid through the upper body of the flow meter in accordance with FIG. 1.

Referring now to FIGS. 1, 3 and 4, the upper body 300 is configured to be releasably connected to the lower body 200; however, this is not required. The upper body is also generally formed of a durable material such as, but not limited to, a metal material or plastic material. The upper body includes a housing 310 having a lower surface. The cross-sectional size and shape of the lower portion of the lower body is configured so that that the lower portion can be at least partially inserted into interior cavity 230 to be releasably connected to the lower body; however this is not required. The upper body can optionally be configured to replace a turbine-based flow meter without having to replace the lower body of the turbine-based flow meter; however, this is not required. When the upper body is configured to replace a turbine-based flow meter, the upper body of the turbine-based flow meter that includes the turbine component is removed from the lower body of the turbine-based flow meter, and the upper body of the flow meter in accordance with the present disclosure is at least partially inserted into and releasably connected to the lower body of the turbine-based flow meter. Such a configuration of the upper body allows for simple replacement of turbine-based flow meters with the upper body of the flow meter in accordance with the present disclosure.

An inlet passage 320 is located in the housing 310 and is configured to be fluidly connected to outer recess 240 when the upper body is connected to the lower body. A core gasket (not shown) and an outer gasket (not shown) are typically used to inhibit or prevent liquid from directly flowing from outer recess 240 into central opening 250 of the lower body when the upper body is connected to the lower body. The core gasket (when used) is positioned on the top surface of cavity wall 280 and forms a liquid seal with the lower surface of the upper body when the upper body is connected to the lower body. The outer gasket (when used) is positioned on the top surface of lower landing 260 and groove 270 and forms a liquid seal with the lower surface of the upper body when the upper body is connected to the lower body. Groove 270 can be used to secure the outer gasket in position in the interior cavity 230; however, this is not required. The material used to form the core gasket (when used) and the outer gasket (when used) is non-limiting. Generally, the core gasket and the outer gasket are formed of an elastomeric material; however, this is not required.

The upper end of the inlet passage 320 terminates into the inlet chamber 330 of the upper body. The flow direction of liquid from the inlet passage 320 can change when the liquid enters the inlet chamber 330; however, this is not required.

As illustrated in FIGS. 1 and 3, the acoustic channel 370 is oriented relative to the inlet chamber 330 such that the flow direction of liquid from the inlet chamber changes when the liquid enters the acoustic channel 370; however, this is not required. As illustrated in FIG. 1, the flow direction of the liquid from the inlet chamber 330 to the acoustic channel 370 changes about 90°; however, the change in flow direction can be other than 90°. The cross-sectional area of the inlet chamber 330 that terminates into the acoustic channel 370 can be about the same as or greater than the minimum cross-sectional area of the acoustic channel 370; however, this is not required.

At the beginning portion of the acoustic channel 370 there is located a first electroacoustic transducer/receiver 350. The size, shape, configuration and material of the first electroacoustic transducer/receiver 350 are non-limiting. The first electroacoustic transducer/receiver can be in contact with the liquid flowing through the inlet chamber or be isolated from the liquid flowing through the inlet chamber. In one non-limiting embodiment, the first electroacoustic transducer/receiver 350 is configured to generate an ultrasonic signal that moves along the acoustic channel 370 as the liquid flows through the acoustic channel 370. In addition or alternatively, the first electroacoustic transducer/receiver 350 can be configured to receive an ultrasonic signal that moves along the acoustic channel 370 as the liquid flows through the acoustic channel 370.

The acoustic channel 370 is a non-linear channel from end to end. The acoustic channel 370 generally has a constant cross-sectional area and cross-sectional shape along the acoustic channel 370; however, this is not required. As best illustrated in FIG. 1, the acoustic channel is formed of five flow channels 371, 372, 373, 374, 375. As can be appreciated, the acoustic channel can be formed of more than five flow channels.

The first flow channel 371 has a first end that is fluidly connected to the inlet chamber 330. The first flow channel has a central longitudinal axis 371*a*. The first electroacoustic transducer/receiver 350 is oriented in the acoustic channel so as to generate a sound wave that moves along the central longitudinal axis of the first flow channel. The second end of the first flow channel terminates into the first end of the second flow channel 372. The first flow channel generally has a constant cross-sectional area and cross-sectional shape along the central longitudinal axis of the first flow channel; however, this is not required.

The second flow channel 372 has a central longitudinal axis 372a. The second end of the second flow channel terminates into the first end of the third flow channel 373. The second flow channel generally has a constant cross-sectional area and cross-sectional shape along the central longitudinal axis of the second flow channel; however, this is not required. The cross-sectional area and cross-sectional shape the second flow channel can be the same or different from the cross-sectional area and cross-sectional shape the first flow channel. The longitudinal length of the second flow channel can be different (e.g., shorter, longer) than the longitudinal length of the first flow channel; however, this is not required. As illustrated in FIG. 1, the longitudinal length of the second flow channel is shorter than the longitudinal length of the first flow channel. The central longitudinal axis of the second flow channel is non-parallel to the central longitudinal axis of the first flow channel. As illustrated in FIG. 1, the central longitudinal axis of the second flow channel is oriented about 90° to the central longitudinal axis of the first flow channel; however, other orientation angles can be used.

Positioned at the second end of the first flow channel and the first end of the second flow channel is an acoustically reflective material 340 configured to cause a sound wave moving along the central longitudinal axis of the first flow channel to change directions in the acoustic channel and then move along the central longitudinal axis of the second flow channel. The acoustically reflective material is generally formed of a different material than the material used to form the acoustic channel; however, this is not required. The acoustically reflective material is formed of a material that is highly reflective of sound waves, such as ultrasonic sound waves. Generally, the acoustically reflective material is formed of a material that reflects at least 50% of a sound wave that contacts the acoustically reflective material, and typically 55-99.999% (and all values and ranges therebetween) of a sound wave that contacts the acoustically reflective material. Non-limiting materials that can be used to form the acoustically reflective material are metal (e.g., brass, stainless steel, tin, nickel, etc.), ceramic materials, graphite, and other highly reflective sound materials. The size, shape and thickness of the acoustically reflective material is non-limiting.

The third flow channel 373 has a central longitudinal axis 373a. The second end of the third flow channel terminates into the first end of the fourth flow channel 374. The third flow channel generally has a constant cross-sectional area and cross-sectional shape along the central longitudinal axis of the third flow channel; however, this is not required. The cross-sectional area and cross-sectional shape the third flow channel can be the same or different from the cross-sectional area and cross-sectional shape the first flow channel and/or second flow channel. The longitudinal length of the third flow channel can be different (e.g., shorter, longer) than the longitudinal length of the first flow channel and/or the second flow channel; however, this is not required. As illustrated in FIG. 1, the longitudinal length of the third flow channel is longer than the longitudinal length of the first flow channel and the second flow channel. The central longitudinal axis of the third flow channel is non-parallel to the central longitudinal axis of the second flow channel. As illustrated in FIG. 1, the central longitudinal axis of the third flow channel is oriented about 90° to the central longitudinal axis of the second flow channel; however, other orientation angles can be used. As also illustrated in FIG. 1, the central longitudinal axis of the third flow channel is generally parallel to the central longitudinal axis of the first flow channel; however, this is not required. Positioned at the second end of the second flow channel and the first end of the third flow channel is an acoustically reflective material 341 that is configured to cause a sound wave moving along the central longitudinal axis of the second flow channel to change directions in the acoustic channel and then move along the central longitudinal axis of the third flow channel. The material, shape, and size of acoustically reflective material 341 can be the same or different from acoustically reflective material 340.

The fourth flow channel 374 has a central longitudinal axis 374a. The second end of the fourth flow channel terminates into the first end of the fifth flow channel 375. The fourth flow channel generally has a constant cross-sectional area and cross-sectional shape along the central longitudinal axis of the fourth flow channel; however, this is not required. The cross-sectional area and cross-sectional shape of the fourth flow channel can be the same or different from the cross-sectional area and cross-sectional shape of the first flow channel, second flow channel and/or third flow channel. The longitudinal length of the fourth flow channel can be different (e.g., shorter, longer) than the longitudinal length of the first flow channel, the second flow channel and/or the third flow channel; however, this is not required. As illustrated in FIG. 1, the longitudinal length of the fourth flow channel is shorter than the longitudinal length of the first flow channel and the third flow channel, and about the same longitudinal length as the second flow channel. The central longitudinal axis of the fourth flow channel is non-parallel to the central longitudinal axis of the third flow channel. As illustrated in FIG. 1, the central longitudinal axis of the fourth flow channel is oriented about 90° to the central longitudinal axis of the third flow channel; however, other orientation angles can be used. As also illustrated in FIG. 1, the central longitudinal axis of the fourth flow channel is generally parallel to the central longitudinal axis of the second flow channel; however, this is not required. As also illustrated in FIG. 1, the central longitudinal axis of the fourth flow channel is oriented about 90° to the central longitudinal axis of the first flow channel; however, this is not required. Positioned at the second end of the third flow channel and the first end of the fourth flow channel is an acoustically reflective material 342 that is configured to cause a sound wave moving along the central longitudinal axis of the third flow channel to change directions in the acoustic channel and then move along the central longitudinal axis of the fourth flow channel. The material, shape, and size of acoustically reflective material 342 can he the same or different from acoustically reflective materials 340, 341.

The fifth flow channel 375 has a central longitudinal axis 375a. The second end of the fifth flow channel terminates into the first end of the outlet chamber 380. The fifth flow channel generally has a constant cross-sectional area and cross-sectional shape along the central longitudinal axis of the fifth flow channel; however, this is not required. The cross-sectional area and cross-sectional shape the fifth flow channel can be the same or different from the cross-sectional area and cross-sectional shape of the first flow channel, the second flow channel, the third flow channel and/or the fourth flow channel. The longitudinal length of the fifth flow channel can be different (e.g., shorter, longer) than the longitudinal length of the first flow channel, the second flow channel, the third flow channel and/or the fourth flow channel; however, this is not required. As illustrated in FIG. 1, the longitudinal length of the fifth flow channel is longer than the longitudinal length of the second flow channel and the fourth flow channel, about the same longitudinal length as the first flow channel, and shorter in length to the third flow channel. The central longitudinal axis of the fifth flow channel is non-parallel to the central longitudinal axis of the fourth flow channel. As illustrated in FIG. 1, the central longitudinal axis of the fifth flow channel is oriented about 90° to the central longitudinal axis of the fourth flow channel; however, other orientation angles can be used. As also illustrated in FIG. 1, the central longitudinal axis of the fifth flow channel is generally parallel to the central longitudinal axis of the first flow channel and the third flow channel; however, this is not required. As also illustrated in FIG. 1, the central longitudinal axis of the fifth flow channel is oriented about 90° to the central longitudinal axis of the second flow channel; however, this is not required. Positioned at the second end of the fourth flow channel and the first end of the fifth flow channel is an acoustically reflective material 343 that is configured to cause a sound wave moving along the central longitudinal axis of the fourth flow channel to change directions in the acoustic channel and then move along the central longitudinal axis of the fifth flow channel. The material, shape, and size of acoustically reflective material 343 can be the same or different from acoustically reflective materials 340, 341, 342. As illustrated in FIG. 1, the five flow channels for a generally S-shaped symmetrically configured acoustic channel.

The inner surface of the acoustic channel 370 can optionally be partially of fully formed or coated with a material that dampens the sound wave reflections as a sound wave moves through the acoustic channel 370; however, this is not required. Materials that can be used include, but are not limited to, Teflon®.

One or more portion of the acoustic channel 370 can optionally include an orifice. The material used to form the orifice is non-limiting. The orifice (when used) can be used to increase the flow rate of the liquid through the acoustic channel. The means by which the orifice (when used) is connected to the inner wall of the acoustic channel is non-limiting (e.g., adhesive, melted connection, friction connection, mechanical connection, coating, etc.). The orifice (when used) generally reduces the cross-sectional area of the acoustic channel 370 by about 0.01-60% (and all values and ranges therebetween).

Located at the end of the acoustic channel 370 is a second electroacoustic transducer/receiver 390. The size, shape, configuration and material of the second electroacoustic transducer/receiver 390 are non-limiting. The second electroacoustic transducer/receiver can be in contact with the liquid flowing through the acoustic channel 370 or can be isolated from the liquid flowing through the outlet chamber. In one non-limiting embodiment, the second electroacoustic transducer/receiver 390 is configured to generate an ultrasonic signal that moves along the longitudinal axis of the acoustic channel 370 as the liquid flows through the acoustic channel 370. In addition or alternatively, the second electroacoustic transducer/receiver 390 can be configured to receive an ultrasonic signal that moves along the longitudinal axis of the acoustic channel 370 as the liquid flows through the acoustic channel 370. In one non-limiting configuration, the first electroacoustic transducer/receiver 350 and the second electroacoustic transducer/receiver 390 are configured such that both electroacoustic transducers are capable of generating a sound wave and receiving a sound wave; however, this is not required. In another non-limiting configuration, the first electroacoustic transducer/receiver 350 is configured such that only the first electroacoustic transducer/receiver 350 is capable of generating a sound wave and the second electroacoustic transducer/receiver 390 is only capable of receiving a sound wave; however, this is not required. In another non-limiting configuration, the second electroacoustic transducer 390 is configured such that only the second electroacoustic transducer/receiver 390 is capable of generating a sound wave and the first electroacoustic transducer/receiver 350 is only capable of receiving a sound wave; however, this is not required. In another non-limiting configuration, the first electroacoustic transducer/receiver 350 or the second electroacoustic transducer/receiver 390 can be substituted for a sound reflecting surface and only a single electroacoustic transducer/receiver is positioned at the top portion of the inlet chamber or the bottom portion of the outlet chamber and such single electroacoustic transducer/receiver is configured to generate a sound wave and also to receive the reflected sound wave; however, this is not required.

As illustrated in FIG. 1, the first electroacoustic transducer/receiver 350 is centered along the central longitudinal axis 371a of the first flow channel 370 of the acoustic channel. Also, the second electroacoustic transducer/receiver 390 is centered along the central longitudinal axis 375a of the fifth flow channel 375 of the acoustic channel 370; however, this is not required. The first electroacoustic transducer/receiver 350 and/or the second electroacoustic transducer/receiver 390 are configured to generate a sound wave SW that moves generally parallel to the center of the acoustic channel 370; however, this is not required. Generally, the first electroacoustic transducer/receiver 350 and the second electroacoustic transducer/receiver 390 have the same shape, size and configuration; however, this is not required. Generally, the first electroacoustic transducer/receiver 350 and the second electroacoustic transducer/receiver 390 are positioned in acoustic channel 370 so as to not obstruct the flow of liquid through the flow meter; however, this is not required. The first and second electroacoustic transducers/receivers are typically powered by electric current. The power supply for the first and second electroacoustic transducers/receivers can be located on or in the upper body and/or be located external to the upper body. The power supply is non-limiting (e.g., battery, solar power battery, power line, etc.). Standard power leads are generally used to connect the first and second electroacoustic transducers/receivers to the power supply.

The outlet chamber 380 has a configuration that is the same as the configuration of the inlet chamber 330; however, this is not required. In one non-limiting embodiment, the shape, size and configuration of the inlet chamber and the outlet chamber are symmetrical. The symmetry of the inlet and outlet chambers can facilitate in obtaining a generally uniform sound wave front as the sound wave travels through the acoustic channel.

The flow direction of the liquid entering the inlet chamber is generally not the same as the flow direction of the liquid exiting the outlet chamber. Also, the longitudinal axis of the liquid flow entering the inlet chamber can be parallel to the longitudinal axis of the liquid flow exiting the outlet chamber; however, this is not required.

Referring now to FIG. 3, the lower section of the upper body 300 is configured to be at least partially inserted into central opening 250 of the lower body 200 such that the end of the outlet chamber is aligned with the outlet interior passageway 224 of the outlet connector 220 of the lower body 200. The upper body 300 can be releasably secured to the lower body by a variety of means. One non-limiting means is illustrated in FIG. 3, wherein a lock screw 600 is used to releasably secure the upper body to the lower body. The lock screw includes threads 602 on the outer surface that are configured to engage with the threads on the inner surface of cavity wall 232. During assembly, the upper body is at least partially inserted in the lower body as described above. Thereafter, the lock screw is inserted over a portion of the upper body and then threadedly connected the lower body. As the lock screw is tightened on the lower body, the lock screw forces the upper body downwardly onto the lower body to thereby releasably secure the upper body to the lower body. As discussed above, the core gasket (when used) and the outer gasket (when used) are used to inhibit or prevent liquid from directly flowing from outer recess 240 into central opening 250 of the lower body when the upper body is connected to the lower body.

Once the upper body is releasably connected to the lower body, the liquid that flows into the inlet interior passageway 214 of the lower body is directed into the outer recess 240 in the interior cavity 230 of the lower body. The liquid then flows from the outer recess 240 into the inlet passage 320 in the housing 310 of the upper body. The liquid then flows from the inlet passage 320 into the inlet chamber 330. The liquid then flows from the inlet chamber, into and through the acoustic channel, and into the outlet chamber 380. As the liquid flows through the acoustic channel, the liquid is at least periodically subjected to a sound wave such as an ultrasonic sound wave. The liquid then flows from the outlet chamber into the outlet interior passageway 224 of the lower body.

Figure 5:
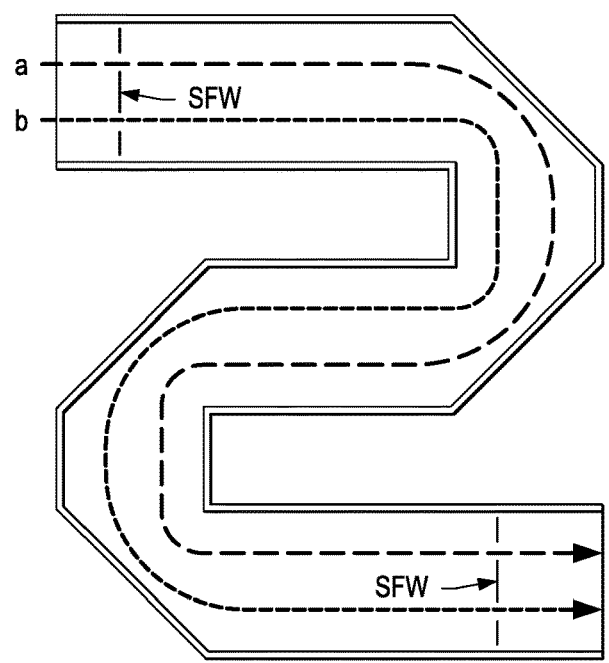
FIG. 5 is a schematic view generally representing the flow path of liquid into, through, and out from the acoustic channel of a flow meter and the wave front of the sound wave moving through the acoustic channel of the flow meter having a non-symmetrical fluid channel configuration.

As illustrated in FIGS. 1, 3 and 4, the acoustic channel has a symmetrical configuration. The first electroacoustic transducer/receiver and the second electroacoustic transducer/receiver are symmetrically oriented along the acoustic channel with respect to one another. The inlet and outlet chambers can optionally be symmetrically oriented with respect to one another. The length of liquid flow paths through the acoustic channel are generally the same. This is illustrated in FIG. 5. FIG. 5 illustrates two liquid flow paths a and b. Due to the symmetry of the inlet chamber, outlet chamber and acoustic channel, the length of the flow path of the liquid is shown to be the same. FIG. 5 also illustrates the sound wave front SWF as the sound wave moves through the liquid as the liquid moves through the acoustic channel. As illustrated in FIG. 5, the first electroacoustic transducer/receiver generates a sound wave and the vertical dashed lines illustrate the movement of the sound wave front SFW through the acoustic channel and then received by the second electroacoustic transducer/receiver. As the sound wave moves through the acoustic channel, the sound wave front SFW remains generally perpendicular to the flow direction of the liquid through the acoustic channel.

Figure 6:
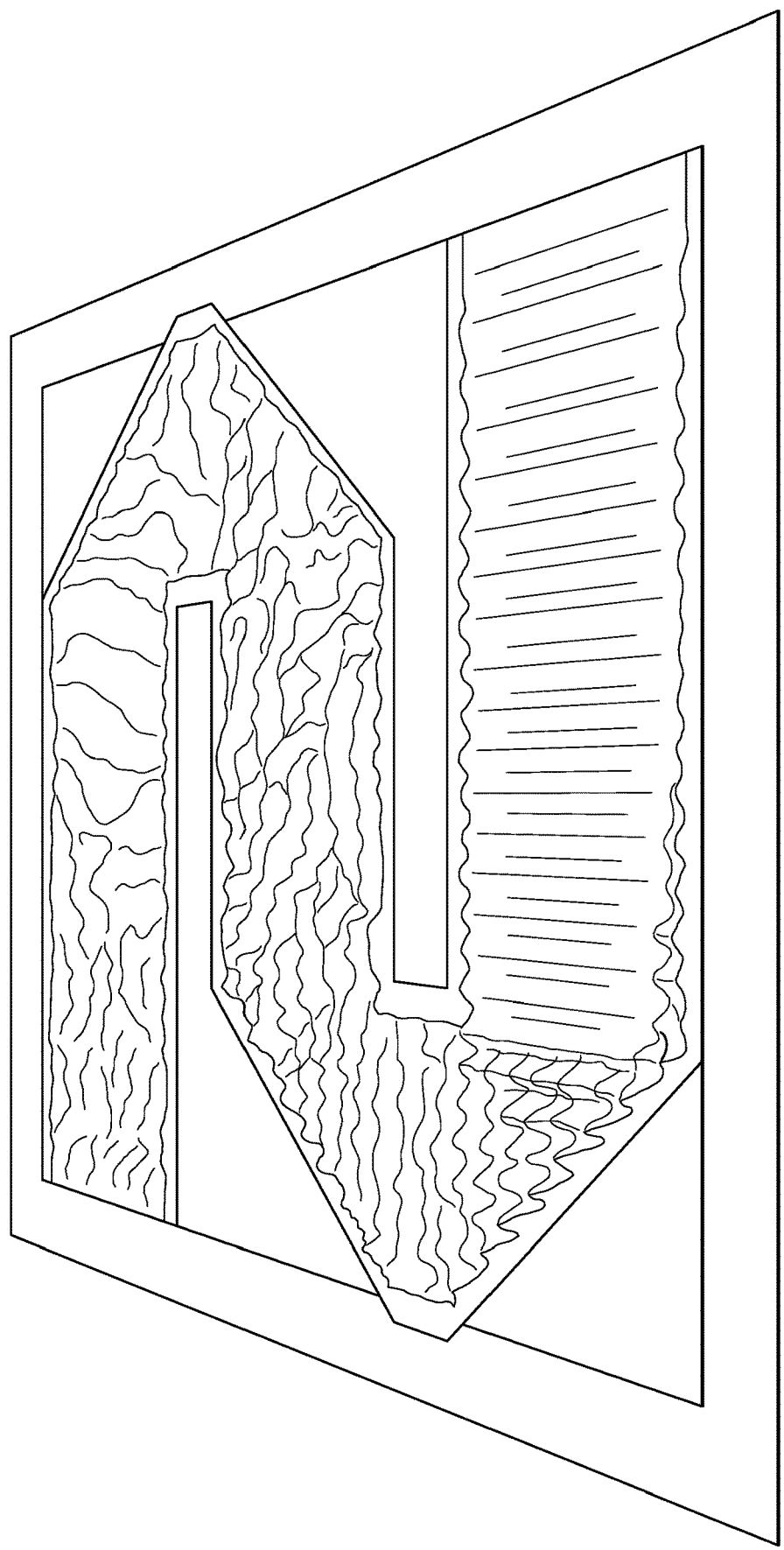
FIG. 6 is an illustration of the wave front of the sound wave moving through the acoustic channel of the liquid flow path of FIG. 5.

The symmetrical liquid pathway through the acoustic channel eliminates or compensates for phase delays for 1) the liquid flow through the acoustic channel, 2) the liquid pressure wave caused by flow rate changes of the liquid through the acoustic channel, and 3) the sound waves as they moves through the acoustic channel. As such, the symmetry of the acoustic channel results in a generally uniform sound wave front as the sound wave travels through the acoustic channel. FIG. 6 is a two-dimensional simulation of the shape of the sound wave front that is received by the second electroacoustic transducer/receiver due to the symmetry of the acoustic channel and the generally same length of the flow path of the liquid through the acoustic channel. As illustrated in FIG. 6, the height of the sound wave front is generally uniform.

In operation, the first electroacoustic transducer/receiver 350 and/or the second electroacoustic transducer/receiver 390 generate a sound wave such as an ultrasonic sound wave along the acoustic channel as fluid flows through the acoustic channel. The electroacoustic transducer/receiver that is located at the opposite end of the acoustic channel of the electroacoustic transducer/receiver that generated the sound wave is configured to receive the sound wave that has moved through the liquid that is flowing through the acoustic channel. The liquid flow through the acoustic channel acts as a phase shifter to the sound wave that is moving through the liquid. The optional use of an orifice in the acoustic channel can cause additional phase shifting of the sound wave as it moves through the acoustic channel and/or be used to dampen sidewall reflection of the sound wave as the sound wave moves through the acoustic channel. When the electroacoustic transducer/receiver receives the sound wave that has passed through the liquid that is flowing through the acoustic channel, the phase change of the sound wave is measured based on the known distance that the sound wave has traveled and the differential in time as a result of the phase change of the sound wave is used to determine the flow rate of the liquid through the flow meter. In one non-limiting embodiment, the sound waves through the acoustic channel are intermittently generated. Although the symmetry of the liquid pathway through the acoustic channel reduces sound wave interference, some interference does exist. By periodically terminating the sound wave generation through the acoustic channel, such interference is allowed to dissipate such that when a new sound wave is generated, a more accurate sound wave is received by the receiver for use in measurement of the flow rate of the liquid through the acoustic channel. In one non-limiting embodiment, there is a 1-100 microsecond (and all values and ranges therebetween) pause between each sound wave generated by the electroacoustic transducer/receiver. As can be appreciated, the pause can be greater than 100 microseconds; however, this is not required. Generally, the length of the pause between the generation of a new sound wave is at least the time period that the electroacoustic transducer/receiver that is receiving the sound wave does not further detect the sound wave that was previously generated by the other electroacoustic transducer/receiver. As such, interference from a plurality of different sound waves is reduced or eliminated. As can be appreciated, the electroacoustic transducer/receiver can generally produce different frequency sound waves to also overcome any interference caused by reflection of the sound waves in the acoustic channel; however, this is not required. An electronic system C that generally includes a controller and/or a processor is configured to control an operation of the first and/or second first electroacoustic transducer/receiver. Generally the electronic system C is connected to the first and/or second first electroacoustic transducer/receiver by one or more wires W or the like. The electronic system C can be used to control the operation, sound wave frequency, and/or how often a sound is generated by the first and/or second first electroacoustic transducer/receiver. The electronic system C can be used to receive a signal from the first and/or second first electroacoustic transducer/receiver that receives the sound wave. The electronic system C can be used to calculate the flow rate of the liquid through the flow meter. The electronic system C can be located on or in the upper body or be located external to the upper body. The electronic system C is generally powered by a power supply that can be located on or in the upper body or be located external to the upper body. Wired and/or wireless communication can optionally be included with the flow meter to transmit flow rate information and/or other types of information to a remote location. The flow meter can optionally include a display that can provide flow rate information and/or other types of information.

It will thus be seen that the objects set forth above, among those made apparent from the preceding description, are efficiently attained, and since certain changes may be made in the constructions set forth without departing from the spirit and scope of the disclosure, it is intended that all matter contained in the above description and shown in the accompanying drawings shall be interpreted as illustrative and not in a limiting sense. The disclosure has been described with reference to preferred and alternate embodiments. Modifications and alterations will become apparent to those skilled in the art upon reading and understanding the detailed discussion of the disclosure provided herein. This disclosure is intended to include all such modifications and alterations insofar as they come within the scope of the present disclosure. It is also to be understood that the following claims are intended to cover all of the generic and specific features of the disclosure herein described and all statements of the scope of the disclosure, which, as a matter of language, might be the to fall therebetween. The disclosure has been described with reference to the preferred embodiments. These and other modifications of the preferred embodiments as well as other embodiments of the disclosure will be obvious from the disclosure herein, whereby the foregoing descriptive matter is to be interpreted merely as illustrative of the disclosure and not as a limitation. It is intended to include all such modifications and alterations insofar as they come within the scope of the appended claims.

What is claimed is:

1. A flow meter comprising:
   a non-linear acoustic channel;
   an inlet chamber coupled to a first end of the non-linear acoustic channel;
   an outlet chamber coupled to a second end of the non-linear acoustic channel; and
   a transducer configured to generate a sound wave and which is oriented with respect to the first end of the non-linear acoustic channel so that the sound wave travels into the non-linear acoustic channel and in a first direction along a pathway between the first end of the non-linear acoustic channel and the second end of the non-linear acoustic channel.

2. The flow meter of claim 1, wherein the transducer is an electroacoustic transducer.

3. The flow meter of claim 2, wherein the sound wave is an ultrasonic sound wave.

4. The flow meter of claim 1, wherein the transducer is a first transducer, and the flow meter comprises a second transducer which is oriented with respect to the second end of the non-linear acoustic channel to receive the sound wave.

5. The flow meter of claim 4, comprising a controller configured to control operation of the first transducer to generate the sound wave and to determine a flow rate of fluid through the acoustic channel by determining a time period between when the first transducer generates the sound wave and when the second transducer receives the sound wave, and using the determined time period to determine the flow rate of the fluid as a function of a distance between the first transducer and the second transducer.

6. The flow meter of claim 4, wherein the sound wave is a first sound wave and the second transducer is configured to generate a second sound wave that travels into the non-linear acoustic channel and in a second direction along a pathway between the first end of the non-linear acoustic channel and the second end of the non-linear acoustic channel, the second direction being opposite the first direction.

7. The flow meter of claim 1, comprising a sound reflecting surface arranged with respect to the second end of the non-linear acoustic channel to cause the sound wave to be reflected so that the reflected sound wave travels in a second direction along a pathway between the first end of the non-linear acoustic channel and the second end of the non-linear acoustic channel, the second direction being opposite the first direction.

8. The flow meter of claim 1, wherein the acoustic channel includes a sound wave dampening coating.

9. The flow meter of claim 1, wherein the non-linear acoustic channel includes:
   a first flow channel portion having a first longitudinal axis, a first end, and a second end, wherein the first end of the first flow channel portion provides the first end of the non-linear acoustic channel;
   a second flow channel portion having a second longitudinal axis, a first end, and a second end, wherein the first end of the second flow channel portion is coupled to the second end of the first flow channel portion, and the second longitudinal axis and the first longitudinal axis are not parallel to each other;
   a third flow channel portion having a third longitudinal axis, a first end, and a second end, wherein the first end of the third flow channel portion is coupled to the second end of the second flow channel portion, and the third longitudinal axis and the second longitudinal axis are not parallel to each other;
   a fourth flow channel portion having a fourth longitudinal axis, a first end, and a second end, wherein the first end of the fourth flow channel portion is coupled to the second end of the third flow channel portion, and the fourth longitudinal axis and the third longitudinal axis are not parallel to each other; and
   a fifth flow channel portion having a fifth longitudinal axis, a first end, and a second end, wherein the first end of the fifth flow channel portion is coupled to the second end of the fourth flow channel portion, the second end of the fifth flow channel portion provides the second end of the non-linear acoustic channel, and the fifth longitudinal axis and the fourth longitudinal axis are not parallel to each other.

10. The flow meter of claim 9, wherein the first longitudinal axis, third longitudinal axis, and the fifth longitudinal axis are substantially parallel to each other.

11. The flow meter of claim 10, wherein the second longitudinal axis and the fourth longitudinal axis are substantially parallel to each other.

12. The flow meter of claim 11, wherein the second longitudinal axis is substantially perpendicular to each of the first longitudinal axis, the third longitudinal axis, and the fifth longitudinal axis, and the fourth longitudinal axis is substantially perpendicular to each of the first longitudinal axis, the third longitudinal axis, and the fifth longitudinal axis.

13. The flow meter of claim 9, wherein:
   the first flow channel portion has a generally constant cross-sectional shape and cross-sectional area along the first longitudinal axis;

the second flow channel portion has a generally constant cross-sectional shape and cross-sectional area along the second longitudinal axis;

the third flow channel portion has a generally constant cross-sectional shape and cross-sectional area along the third longitudinal axis;

the fourth flow channel portion has a generally constant cross-sectional shape and cross-sectional area along the fourth longitudinal axis; and the fifth flow channel portion has a generally constant cross-sectional shape and cross-sectional area along the fifth longitudinal axis.

14. The flow meter of claim 1, wherein the non-linear acoustic channel, the inlet chamber, the outlet chamber, and the transducer are arranged on a first body portion of the flow meter, and wherein the flow meter includes a second body portion releasably coupled to the first body portion, and the second body portion includes:

an inlet passageway coupled to the inlet chamber when the first body portion and the second body portion are coupled to each other;

an outlet passageway coupled to the outlet chamber when the first body portion and the second body portion are coupled to each other;

wherein the inlet passageway and the outlet passageway are arranged in a first plane, and wherein the acoustic channel is arranged in a second plane that is parallel to the first plane.

15. A system comprising:

a fluid conduit; and a flow meter including:
  a non-linear acoustic channel;
  an inlet passageway coupled to the fluid conduit;
  an inlet chamber coupled to a first end of the non-linear acoustic channel and to the inlet passageway;
  an outlet passageway coupled to the fluid conduit;
  an outlet chamber coupled to a second end of the non-linear acoustic channel and to the outlet passageway;
  a first transducer configured to generate a sound wave and which is oriented with respect to the first end of the non-linear acoustic channel so that the sound wave travels into the non-linear acoustic channel and in a first direction along a pathway between the first end of the non-linear acoustic channel and the second end of the non-linear acoustic channel;
  a second transducer which is oriented with respect to the second end of the non-linear acoustic channel to receive the sound wave; and
  a controller configured to control operation of the first transducer to generate the sound wave and to determine a flow rate of fluid through the acoustic channel by determining a time period between when the first transducer generates the sound wave and when the second transducer receives the sound wave, and using the determined time period to determine the flow rate of the fluid as a function of a distance between the first transducer and the second transducer.

16. The system of claim 15, wherein the first and second transducers are each an electroacoustic transducer, and wherein the sound wave is an ultrasonic sound wave.

17. The system of claim 15, wherein the non-linear acoustic channel includes:

a first flow channel portion having a first longitudinal axis, a first end, and a second end, wherein the first end of the first flow channel portion provides the first end of the non-linear acoustic channel;

a second flow channel portion having a second longitudinal axis, a first end, and a second end, wherein the first end of the second flow channel portion is coupled to the second end of the first flow channel portion, and the second longitudinal axis and the first longitudinal axis are not parallel to each other;

a third flow channel portion having a third longitudinal axis, a first end, and a second end, wherein the first end of the third flow channel portion is coupled to the second end of the second flow channel portion, and the third longitudinal axis and the second longitudinal axis are not parallel to each other;

a fourth flow channel portion having a fourth longitudinal axis, a first end, and a second end, wherein the first end of the fourth flow channel portion is coupled to the second end of the third flow channel portion, and the fourth longitudinal axis and the third longitudinal axis are not parallel to each other; and a fifth flow channel portion having a fifth longitudinal axis, a first end, and a second end, wherein the first end of the fifth flow channel portion is coupled to the second end of the fourth flow channel portion, the second end of the fifth flow channel portion provides the second end of the non-linear acoustic channel, and the fifth longitudinal axis and the fourth longitudinal axis are not parallel to each other.

18. The system of claim 17, wherein the first flow channel portion, the second flow channel portion, the third flow channel portion, the fourth flow channel portion, and the fifth flow channel portion are arranged so that the non-linear acoustic channel has a generally S shape.

* * * * *